(12) United States Patent
Ren et al.

(10) Patent No.: US 9,197,581 B2
(45) Date of Patent: Nov. 24, 2015

(54) METHOD AND APPARATUS FOR DIVERTING OPERATIONAL LOAD ON NETWORKS THROUGH ENTITLEMENT PROFILE INCENTIVES

(71) Applicant: Verizon Patent and Licensing Inc., Basking Ridge, NJ (US)

(72) Inventors: Dahai Ren, Lincoln, MA (US); Ming Chen, Bedford, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 117 days.

(21) Appl. No.: 13/931,066

(22) Filed: Jun. 28, 2013

(65) Prior Publication Data

US 2015/0006731 A1  Jan. 1, 2015

(51) Int. Cl.
*H04L 29/12* (2006.01)
*H04L 12/927* (2013.01)
*H04L 12/911* (2013.01)

(52) U.S. Cl.
CPC ............ *H04L 47/805* (2013.01); *H04L 47/822* (2013.01); *H04L 47/826* (2013.01)

(58) Field of Classification Search
CPC ....................................................... H04L 29/12
USPC ......................................................... 709/226
See application file for complete search history.

(56) References Cited

U.S. PATENT DOCUMENTS

| | | | |
|---|---|---|---|
| 8,914,524 B1 * | 12/2014 | Anderson et al. | 709/228 |
| 2003/0045273 A1 * | 3/2003 | Pyhalammi et al. | 455/412 |
| 2005/0261062 A1 * | 11/2005 | Lewin et al. | 463/42 |

* cited by examiner

*Primary Examiner* — Vivek Srivastava
*Assistant Examiner* — Sibte Bukhari

(57) ABSTRACT

An approach is provided for determining a temporal window based on an operational load of a network; creating an entitlement profile corresponding to the temporal window for accessing content over the network; and specifying an access right to the content for the entitlement profile applicable during the temporal window, and a corresponding device.

17 Claims, 9 Drawing Sheets

FIG. 7A

| On-Peak Operational Load Temporal Window | Monday | Tuesday | Wednesday | Thursday | Friday | Saturday | Sunday |
|---|---|---|---|---|---|---|---|
| Entitlement Profile A | X | X | X |  | X | X | X |
| Entitlement Profile B | X |  | X | X | X | X | X |
| Entitlement Profile C |  | X |  | X |  |  | X |
| Entitlement Profile D |  |  |  |  |  | X | X |

FIG. 7B

| On-Peak Operational Load Temporal Window | Day 1 | Day 2 |
|---|---|---|
| Entitlement Profile A | X | X |
| Entitlement Profile B | X |  |
| Entitlement Profile C |  | X |
| Entitlement Profile D |  |  |

METHOD AND APPARATUS FOR DIVERTING OPERATIONAL LOAD ON NETWORKS THROUGH ENTITLEMENT PROFILE INCENTIVES

BACKGROUND INFORMATION

The Internet is increasingly being used by service providers for the streaming of audio and video content. During peak operational loads, approximately two-thirds of all downstream Internet traffic across North America constitutes audio and/or video-streaming services provided by such service providers. In one case, up to half of such traffic may be accounted to a single service provider. Such usage also can be the result of a small percentage of Internet users. Such a pattern of downstream traffic poses a threat to both the Internet and service providers. The small percentage of Internet users consuming an extraordinary amount of network bandwidth during peak usage may cause frequent network congestion that impacts the usage of all users. Further, service providers are obligated to have resources on standby to cope with the on-peak usage even though the resources are not used during off-peak times. Such usage of the resources amounts to waste. Accordingly, service providers face significant technical challenges in shifting Internet usage away from on-peak times.

Based on the foregoing, there is a need for diverting delivery of content to off-peak times.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIG. 7A is a table of entitlement profiles with varying access rights for temporal windows for a subscription-based content delivery service, according to an exemplary embodiment;

FIG. 7B is a table of entitlement profiles with varying access rights for temporal windows for an on-demand-based content delivery service, according to an exemplary embodiment;

DESCRIPTION OF THE PREFERRED EMBODIMENT

An apparatus, method, and software for diverting delivery of content to off-peak times, is described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although various embodiments are described with respect to streaming movies to users, it is contemplated that the approach described herein may be used with any method of delivering or providing any type of content to users over one or more networks, such as users downloading and/or streaming any type of audio and/or visual content, such as images, sounds, videos, etc., or other forms of data.

Figure 1:
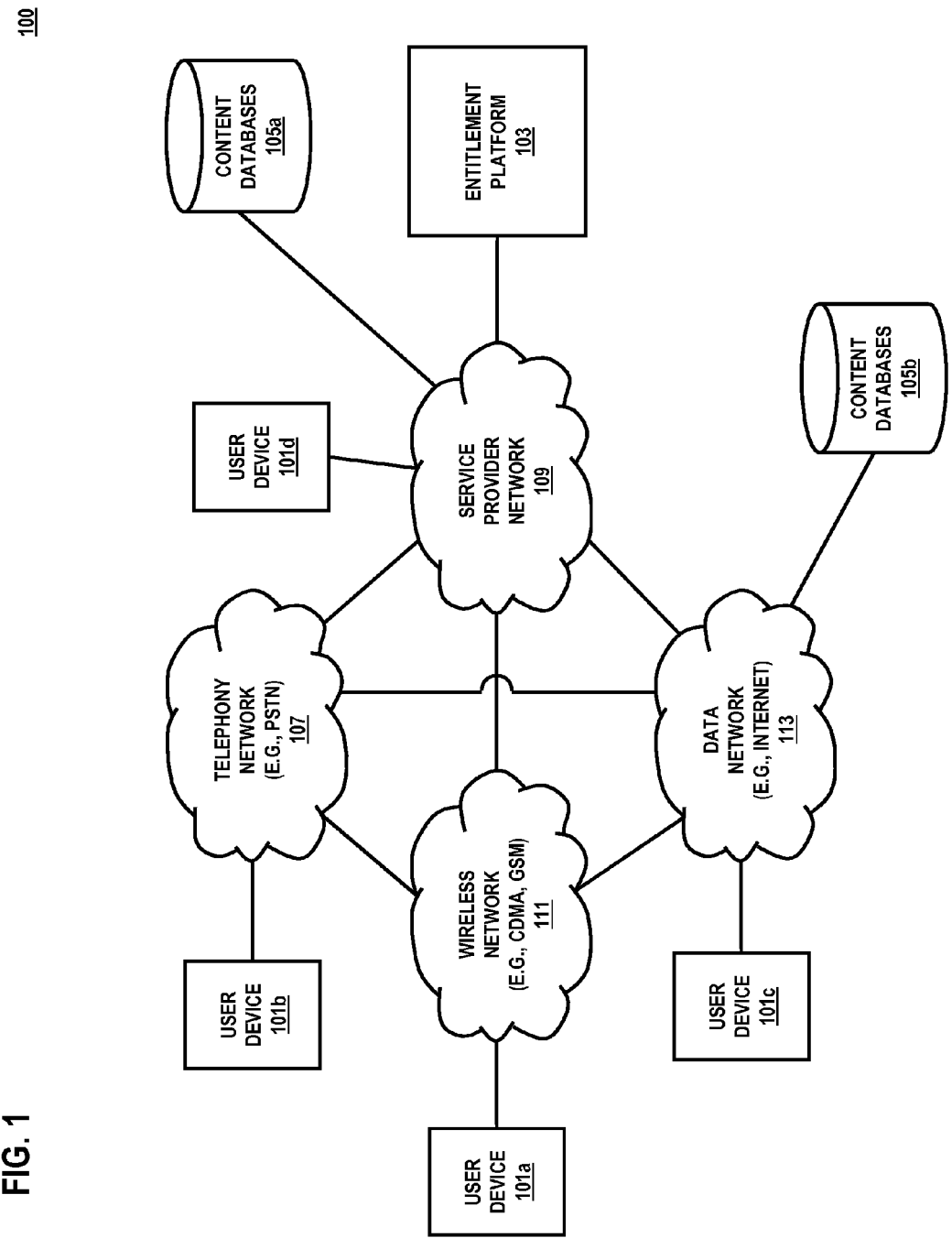
FIG. 1 is a diagram of a system capable of diverting delivery of content to off-peak times, according to an exemplary embodiment.

FIG. 1 is a diagram of a system 100 capable of diverting delivery of content to off-peak times through the use of entitlement profiles and incentives, such as price, according to one embodiment. Content streamed by users over fixed-line data traffic accounts for roughly 65% of all fixed-line data traffic during peak times across North America. Because of the nature of the content and preferences of users consuming the content, such peak times are generally between 4 PM and 12 AM, or more particularly between 9 PM and 12 AM, seven days a week. Because users generally do not want to consume the content during early morning and/or early afternoon hours, it is difficult to divert the operational load of providing the content to off-peak times. Thus, service providers associated with providing the content are required to invest in resources that are only used during the on-peak times. Having the requirement for these resources, such as backup servers and additional bandwidth, for only the on-peak times leads to waste during off-peak times.

The approach of the system 100 stems, in part, from the recognition that there is a need to distribute the operational load associated with delivering content to users through intelligent user profile management and incentives that acknowledge a general reluctance of users to change their consumption preferences. By way of example, a day may be divided into two sessions, an on-peak session and an off-peak session. The off-peak session may be, for example, between 12 AM to 10 AM, and the on-peak session may be, for example, between 10 AM and 12 AM. Based on user habits in viewing or otherwise consuming content, it is difficult to shift users from the on-peak session to the off-peak session because such a shift is against the habit of users to view, for example, streaming movies between the hours of midnight and early morning (e.g., 10 AM). Even the on-peak session may be divided into sub-sessions of varying operational loads on a network. For example, a first session between 10 AM and 4 PM may experience less operational load than a second session between 4 PM and 9 PM, which in turn may experience less operational load than a third session between 9 PM and 12 AM. Thus, rather than shifting all users from the on-peak session to the off-peak session, users may be incentivized to switch between, for example, different sessions within the on-peak session, while also possibly shifting users to the off-peak session.

As shown, the system 100 includes an entitlement platform 103 implemented as, for example, part of a service provider network 109. However, the entitlement platform 103 could be implemented as any part of the system 100. The entitlement platform 103 allows for the diversion of traffic to times of less operational load on a network to reduce network congestion and the need for backup resources the service providers would otherwise be required to have. The entitlement platform 103 can determine a temporal window based on an operational load of a network, such as the service provider network 109 and/or the data network 113 (e.g., the Internet). The entitlement platform 103 can further create an entitlement profile corresponding to the temporal window for accessing content over the network. Further, the entitlement platform 103 can specify an access right to the content for the entitlement profile applicable during the temporal window. Intelligent management of the entitlement profile and the temporal window can cause incentives for users to request content, such as through downloads or streaming, at times other than when a network used for streaming the content is experiencing a high operational load. The entitlement platform 103 may provide authorization for a user to access content from the service provider associated with the service provider network 109, which may be the same service provider of the content. In one embodiment, the entitlement platform 103 may provide authorization for a user to access content from a third-party service provider that provides the content, but relies, at least in part, on the service provider network 109 to provide the content to the user.

The service provider network 109 can interact with one or more other networks, such as a telephony network 107, a wireless network 111, and/or a data network 113. The service provider network 109 can include one or more content databases 105a that store content provided by the service provider associated with the service provider network 109 to one or more user devices 101a-101d (collectively referred to as UD 101). Alternatively, or in addition to the content databases 105a of the service provider, the system 100 may include one or more content databases 105b associated with third-party service providers, which can provide content to the UD 101 through, for example, the data network 113 and/or the service provider network 109 servicing the UD 101.

For illustrative purposes, the networks 107-113 may be any suitable wireline and/or wireless network, and may be managed by one or more service providers. For example, the telephony network 107 may include a circuit-switched network, such as the public switched telephone network (PSTN), an integrated services digital network (ISDN), a private branch exchange (PBX), or other like network. The wireless network 111 may employ various technologies including, for example, code division multiple access (CDMA), enhanced data rates for global evolution (EDGE), general packet radio service (GPRS), mobile ad hoc network (MANET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like. Meanwhile, the data network 113 may be any local area network (LAN), metropolitan area network (MAN), wide area network (WAN), the Internet, or any other suitable packet-switched network, such as a commercially owned, proprietary packet-switched network, such as a proprietary cable or fiber-optic network.

Although depicted as separate entities, the networks 107-113 may be completely or partially contained within one another, or may embody one or more of the aforementioned infrastructures. For instance, the service provider network 109 may embody circuit-switched and/or packet-switched networks that include facilities to provide for transport of circuit-switched and/or packet-based communications. It is further contemplated that the networks 107-113 may include components and facilities to provide for signaling and/or bearer communications between the various components or facilities of the system 100. In this manner, the networks 107-113 may embody or include portions of a signaling system 7 (SS7) network, or other suitable infrastructure to support control and signaling functions.

According to exemplary embodiments, the UDs 101 may be utilized to communicate over the system 100 and may include any customer premise equipment (CPE) capable of sending and/or receiving information over one or more of the networks 107-113. For instance, the UDs 101 may be a voice terminal, such as a suitable plain old telephone service (POTS) device, facsimile machine, etc., a mobile device (or terminal), such as a cellular phone, radiophone, satellite phone, smart phone, wireless phone, or any other suitable mobile device, such as a personal digital assistant (PDA), pocket personal computer, tablet, customized hardware, etc. Further, the UDs 101 may be any computing device, such as a VoIP phone, skinny client control protocol (SCCP) phone, session initiation protocol (SIP) phone, IP phone, personal computer, softphone, workstation, terminal, server, etc. The UDs 101 may also be used by users to consume, such as download and/or stream, content from the content databases 105a and 105b through the one or more service providers of the content. By way of example, a user may use a UD 101, such as a tablet, to stream content to the tablet, such as a movie, for the user to view.

The entitlement platform 103 may determine one or more temporal windows, which may be one or more periods of time in which a user may access or consume, or attempt to access or consume, content. By way of example, a temporal window may be an hour of a day, such as the specific hour between 9 PM and 10 PM. A temporal window may be longer or shorter than an hour, such the hours between 12 AM and 12 PM. In one embodiment, a temporal window may be the same time over more than one day, such as the period of time between 5 PM and 12 AM during Mondays and Tuesdays. In one embodiment, a temporal window may be the same time during all days of the week, such as 9 PM though 12 AM Sunday through Saturday. In one embodiment, a temporal window may be a period of time during various days of the week, such as 5 PM through 12 AM Mondays, Wednesdays, Saturdays and Sundays. Further, the temporal window may correspond to a period of time during which operational load of a network is above a threshold load.

As discussed above, the operational load of a network is generally the highest between the hours of 9 PM and 12 AM based on a small amount of users streaming a large amount of data, such as in the form of streaming movies. Thus, a temporal window may be considered between 9 PM and 12 AM, everyday, or various days, of the week. Accordingly, in one embodiment, the entitlement platform 103 may determine temporal context associated with the operational load of a network satisfying at least one threshold. Based on the temporal context, the entitlement platform 103 can determine the temporal window. Thus, a temporal window associated with a threshold operational load of a network satisfying a threshold for low operational load may be, for example, between the hours of 12 AM and 10 AM. A temporal window associated with a threshold operational load of a network satisfying a threshold for high operational load may be, for example, between the hours of 9 PM and 12 AM.

In one embodiment, there can be two types of content delivery services, such as streaming services: subscription based and on-demand based. Subscription based entails, for example, a user being entitled to watch a set number, or unlimited, content (e.g., movies) at any time if the movies are included within a catalogue of movies associated with the subscription. Such a subscription may be based on a month-to-month reoccurring basis, such that, for example, the number of movies a user can watch resets at the beginning of a new month. On-demand based entails, for example, a user purchasing a temporary license to watch a movie that will expire in a predefined period of time after the temporary license was purchased, after playback of the movie has started, or a combination thereof. In one embodiment, there may be different temporal windows based on the type of subscription. For example, a temporal window associated with various days of the week, such as Monday and Wednesday, during on-peak times may be for a subscription based streaming service. Further, a different temporal window associated with a peak operational load during one day of a 48 hour period may be associated with an on-demand subscription based streaming service.

The entitlement platform 103 creates an entitlement profile that corresponds to a temporal window. In one embodiment, one entitlement profile may correspond to more than one temporal window. For example, an entitlement profile may correspond to the temporal window of during on-peak hours, seven days of the week. Another entitlement profile may correspond to the temporal window of during on-peak hours during Monday, another temporal window of on-peak hours during Wednesday, and another temporal window of on-peak hours during Saturday and Sunday. Such entitlement profiles may correspond to a subscription-based streaming of content. Another entitlement profile may correspond to a temporal window of on-peak times during a 24 hour period for a total of a 48 hour period, such as on-peaks times during a first day of a two-day period. Another entitlement profile may correspond to a temporal window of on-peaks times during a second day of a two-day period. Such entitlement profiles may correspond to an on-demand-based streaming of content.

The entitlement platform 103 further specifies an access right to the content for the entitlement profile during the temporal window. The access right allows access to the content during the temporal window. The access may constitute streaming, downloading or otherwise retrieving the content, such as streaming a movie during the temporal window. In one embodiment, if a user is associated with an entitlement profile, such as being subscribed to an entitlement profile, and the entitlement profile corresponds to a temporal window and an access right during the temporal window, the user can stream content during the temporal window. Otherwise, if the user is not associated with the entitlement profile, the temporal window or the access right, the user cannot stream content during the temporal window. Thus, where the temporal window corresponds to on-peak times of operational load of a network, and the user is, for example, not associated with an entitlement profile that include an access right to the temporal window, the user cannot stream content during the temporal window. Thus, the user cannot add to the operational load of the network. Instead, the user is required to stream the content at other times, thus diverting operational load to other, off-peak times.

Certain content may be associated with one or more parameters that affect whether a user can consume the content during a specified temporal window. For example, content such as a movie has a specific runtime. If a user would like to watch a movie, the user may need, for example, a two hour period of time to complete the movie based on the runtime (e.g., a parameter of the content). Thus, although the user may have access rights to stream content according to a current temporal window, the temporal window may not last another two hours. Accordingly, in one embodiment, the entitlement platform 103 may determine whether to deliver content to a user based on one or more parameters associated with the content. In the example provided above, the entitlement platform 103 may determine to not provide the streaming of the movie to the user because the runtime of the movie will exceed the current temporal window. In one embodiment, the entitlement platform 103 may determine to provide the streaming of the movie to the user but stop the streaming once the temporal window is over. In such a case, the entitlement platform 103 may warn the user of the inability to consume or access the entire streamed content because of the future expiration of the temporal window. When the streaming is stopped because of the expiration of the temporal window, the user may begin streaming the movie again, such as from where the user left off, once the user has access rights to another current temporal window.

In one embodiment, upon the entitlement platform 103 determining that one or more parameters of content conflict with an access right or a temporal window for completing streaming of the content, the entitlement platform 103 may prompt the user for at least a temporary change that will allow the user to fully consume or stream the entire content. The temporary change may be associated with a temporary change in an entitlement profile that includes access rights to the current temporal window or another temporal window that will allow the user to fully consume or access the content. This analysis may occur at the time of the request for the content, or at the time of a temporal window ending that otherwise prevents the user from continuing to stream the content. The temporary change in the entitlement profile may last according to the shorter or the longer of, for example, the length of the movie or the length of the temporary temporal window.

In one embodiment, prior to prompting the user for a temporary change, the entitlement platform 103 may determine whether one or more networks that will deliver the content can accommodate delivering the content. Thus, the entitlement platform 103 can determine a current operational load of a network associated with a request for content, a current delivery of content, or a combination thereof. The entitlement platform 103 may prompt the user for the temporary change based on the current operational load. Thus, if the current operational load is such that the network cannot handle the additional resources of delivering the content, the entitlement platform 103 may determine to not prompt the user. If the current operational load is such that the network can handle the additional resources, the entitlement platform 103 may prompt the user for the temporary change to accommodate the request for content or the continuing delivery of content, such as in the case a user is currently streaming a movie.

Based on the foregoing, the entitlement platform 103 can create different entitlement profiles that correspond to access rights for different temporal windows. Some of the temporal windows may correspond to on-peak times and some of the temporal windows may correspond to off-peak times. Based on the preferences of users, most users would like to be able to access content during the on-peak times. However, to subscribe users to entitlement profiles associated with temporal windows during off-peak times, the entitlement platform 103 may create one or more incentives associated with the entitlement profiles corresponding to temporal windows of off-peak times. The incentives may be, for example, pricing, bonus features, higher quality, or a combination thereof.

For example, an entitlement profile associated with a temporal window that allows a user to access content during on-peak times seven days of the week may be the most expensive entitlement profile for a user to subscribe to because this entitlement profile will not lead to diverting operational load from on-peak times. An entitlement profile associated with a temporal window that allows a user to access content during on-peak times only during the weekends may be the least expensive entitlement profile, as this entitlement profile will lead to diverting operational load of a network to off-peak times. Entitlement profiles with temporal windows that allow users to access content during on-peak times between the two entitlement profiles discussed above can be priced between the most and least expensive. However, the incentives may be based on any other factor that would create an incentive for one entitlement profile over another that would also lead to diverting traffic from on-peak times of operational load to off-peak times of operational load.

In one embodiment, different resources are required for different networks. For example, a service provider may provide access to both a private network and a public network to a user. For example, the private network may be the network built and serviced by the service provider and the public network may be, for example, the Internet, or a separate private network provided by the service provider for users to access the public network, such as the Internet. In one embodiment, rather than providing a temporal shift in the consumption of the content, the entitlement platform 103 may provide a network shift in the consumption of the content, from a public network, such as over the Internet, to a private network maintained and operated by the service provider. Thus, an entitlement profile may include, in addition or regardless of a temporal window, a network window that prohibits or otherwise controls which network a user may access content over.

Figure 2:
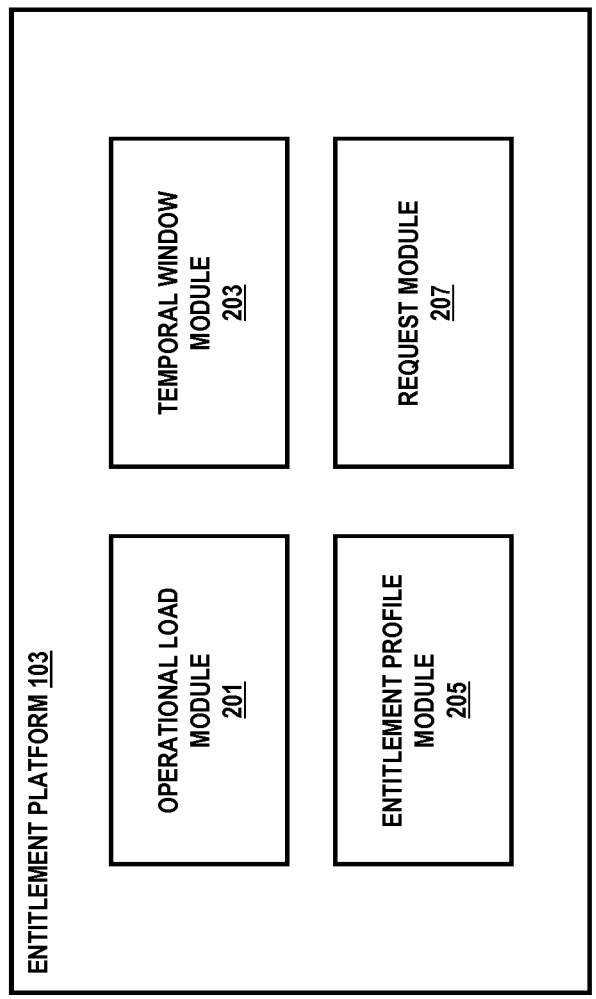
FIG. 2 is a diagram of an entitlement platform capable of diverting delivery of content to off-peak times, according to an exemplary embodiment.

FIG. 2 is a diagram of the components of an entitlement platform 103, according to one embodiment. By way of example, the entitlement platform 103 includes one or more components for diverting delivery of content to off-peak times through incentives. It is contemplated that the functions of these components may be combined in one or more components or performed by other components of equivalent functionality. In this embodiment, the entitlement platform 103 includes an operational load module 201, a temporal window module 203, an entitlement profile module 205, a request module 207 and a content delivery module 209.

The operational load module 201 determines the operational loads of one or more networks associated with delivering content to a user. The operational load may be the amount of traffic that a network has experienced, is currently experiencing, or is expected to experience. The operational load may be an instantaneous load, or a total, a mean, a mode or a median load over a specified period of time. The operational load may also be a plot of the load experienced over a period of time, such the operational load over a network for a 24 hour period. By way of example, the operational load may be determined for a 24 hour period to track the pattern of user consumption of network resources during both off-peak and on-peak times. In one embodiment, where the network is a public network, such as the Internet, the operational load module 201 may determine the operational load of the Internet through one or more third parties that have acquired the information. In one embodiment, where the network is a private network or a public network, the operational load module 201 may perform, for example, analysis on one or more network traffic sources to directly determine the operational load of the network.

The temporal window module 203 determines temporal windows. The temporal window module 203 may determine various temporal windows for various periods of time or based on other context information. In one embodiment, the temporal window module 203 may interface with the operational load module 201 to determine the temporal context of when the operational load of a network exceeds a threshold for determining the on-peak times of the operational load. The threshold may be, for example, when 85% of the network resources are being used, such as bandwidth. By way of example, such an on-peak time may be between 9 PM and 12 AM, seven days a week.

In one embodiment, the temporal window module 203 may determine a temporal window for only on-peak times. In one embodiment, the temporal window module 203 may determine a temporal window for on-peak times and a temporal window for off-peak times. In one embodiment, the temporal window module 203 may determine multiple temporal windows during on-peak times, representing different operational loads within the on-peak times. By way of example, for each day of the week, the temporal window module 203 may determine a temporal window between 12 AM and 5 PM, representing an off-peak time. Further, the temporal window module 203 may determine a temporal window between 5 PM and 9 PM, representing a first on-peak time. Further, the temporal window module 203 may determine a temporal window between 9 PM and 12 AM, representing a second on-peak time. Such temporal windows may variously apply, for example, to entitlement profiles associated with a subscription-based streaming service.

The temporal window module 203 may alternatively determine a temporal window that applies to two or more consecutive days during the on-peak times, such as 9 PM to 12 AM. The temporal window module 203 may further determine a temporal window that applies to one day out of two consecutive days during the on-peak times. The temporal window module 203 may further determine a temporal window that applies to the other day out of two consecutive days during the on-peak times. Such temporal windows may apply, for example, to entitlement profiles associated with an on-demand-based streaming service. By way of example, an on-demand streaming service may allow a user to stream a movie during a period of time beginning from purchasing the ability to stream the movie to the end of two consecutive days. For example, if a user purchases the ability to stream a movie at 12 AM Saturday, the user generally has the ability to stream the movie until 11:59 PM Sunday. The temporal window module 203 may determine one or more temporal windows that apply to Saturday through Sunday, such as a temporal window that applies to on-peak time during Saturday and a temporal window that applies to on-peak time during Sunday. In addition to purchasing the ability to stream the movie in general from Saturday to Sunday (e.g., two consecutive days), through entitlement profiles associated with the temporal windows a user may purchase the ability to stream the movie during none, either one, or both of the temporal windows during the on-peak times for Saturday and Sunday. Thus, a user may stream the movie from 12 AM Saturday through 11:59 PM Sunday, except for between 9 PM Saturday to 12 AM Sunday if the user does not have rights to the temporal window associated with on-peak time on Saturday. Alternatively, the temporal window of 9 PM to 12 AM for both Saturday and Sunday may be considered one temporal window, and the user may purchase rights to the temporal window separately for Saturday and Sunday to result in the same effect of having the ability to stream the movie during none, either one, or both of on-peak times during Saturday and Sunday.

The entitlement profile module 205 determines entitlement profiles and associates the entitlement profiles with temporal windows created by the temporal window module 203. The entitlement profile module 205 further creates access rights to content for temporal windows associated with the entitlement profiles. The entitlement profile module 205 also generates corresponding incentives in the entitlement profiles based on the varying access rights in the temporal windows. The entitlement profile module 205 can further track the entitlement profiles assigned to different users, different UDs 101 of the users, or a combination thereof. Thus, when a request is received for content at the entitlement platform 103, the entitlement profile module 205 may determine the entitlement profile associated with the user and/or device associated with the request.

By way of example, the entitlement profile module 205 can generate four entitlement profiles: the first entitlement profile allowing a user to stream content during a temporal window corresponding to on-peak times, seven days a week; the second entitlement profile allowing a user to stream content during a temporal window corresponding to on-peaks times only during the weekend; the third entitlement profile allowing a user to stream content during a temporal window corresponding to on-peak times during the weekend, Tuesdays, and Thursdays; and the fourth entitlement profile allowing a user to stream content during a temporal window corresponding to on-peak times during the weekend, Mondays, Wednesdays and Fridays. For all four entitlement profiles, the user can stream content any time outside of the temporal windows. The effect of the first entitlement profile would not cause a user to consume content outside of the on-peak times. Although the second entitlement profile would reduce the operational load during on-peaks times during the week, alone there is no reason for a user to select the second profile. Thus, the entitlement profile module 205 may determine incentives for the second through fourth entitlement profiles to cause users to select these profiles over the first entitlement profile.

By way of example, the second entitlement profile may be the least expensive for a user to subscribe to, while the third and fourth are progressively more expensive; with the first entitlement profile being the most expensive out of the four. Thus, users are provided with an incentive to subscribe to one of the second through four entitlement profiles, which have the effect of reducing the operational load of a network during on-peak times during the week. However, as discussed above, the incentive can be based on any factor, or combined with multiple factors, for causing a user to select a more limiting entitlement profile in terms of when a user can consume content over a less limiting entitlement profile.

The request module 207 processes requests for content from the users. A request for content may be directed to the entitlement platform 103, or may be forwarded to the entitlement platform 103 by one or more service providers who will service the content to the user. The request module 207 determines a temporal window associated with an entitlement profile of a user that made the request. The request module 207 may also determine context information associated with the request and one or more parameters associated with the content. The context information associated with the request may be processed by the request module 207 to determine what time the request is for and whether the time corresponds to a temporal window with access rights in an entitlement profile associated with the user. The one or more parameters of the content may be processed by the request module 207 to determine, for example, whether content will extend beyond a temporal window that a user has access to while the user consumes or is delivered the content. By way of example, the one or more parameters may be the runtime of a movie or the download time required to deliver content to the user.

In one embodiment, if the user has access rights to a temporal window within which the content will be delivered to the user, the request module 207 authorizes the user to receive the request. If the user does not have access rights to a temporal window within which the content will be delivered to the user, the request module 207 will not authorize the user to receive the request. In one embodiment, if the timing of the request does not satisfy access rights to a temporal window, or if the current time of the request satisfies the access rights to a temporal window but the one or more parameters of the content may not satisfy the access rights to a temporal window, the request module 207 may prompt the user for a temporary change in entitlement profile that corresponds to one that has access rights in the particular temporal window required to access the content. The request module 207 may warn the user of the insufficiency of the current user's entitlement profile for consuming the content and/or prompt the user for a change in the entitlement profile.

Figure 3:
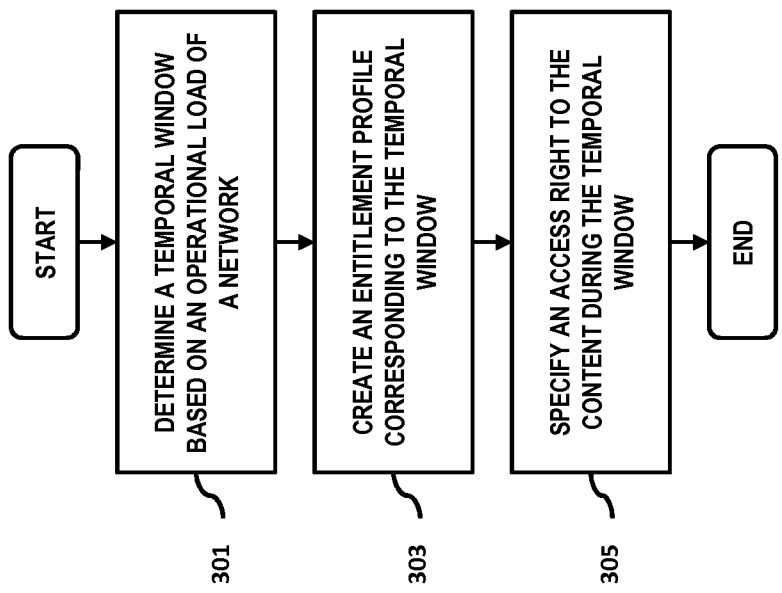
FIG. 3 is a flowchart of creating entitlement profiles for diverting delivery of content to off-peak times, according to an exemplary embodiment.
Figure 9:
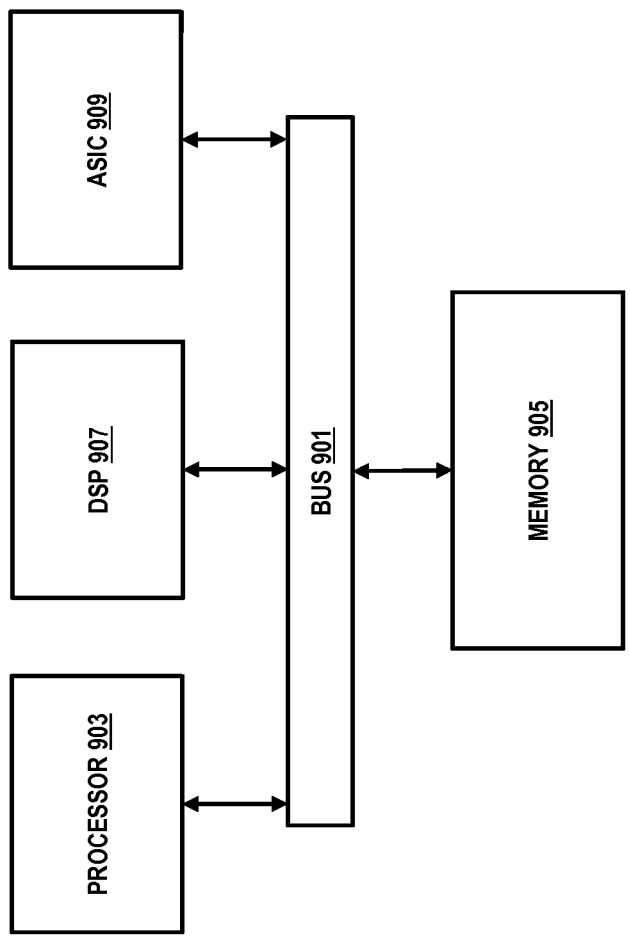
FIG. 9 is a diagram of a chip set that can be used to implement various exemplary embodiments.

FIG. 3 is a flowchart of a process of creating entitlement profiles for diverting delivery of content to off-peak times, according to one embodiment. In one embodiment, the entitlement platform 103 performs the process 300 and is implemented in, for instance, a chip set including a processor and a memory as shown in FIG. 9. In step 301, the entitlement platform 103 determines a temporal window based on an operational load of a network. The temporal window is a period of time that is based on the operational load of the network associated with delivering content to a user. In one embodiment, the temporal window may represent the period of time in which the operational load on the network is the highest, or above a set threshold, such as above 85% capacity of the network bandwidth and/or network resources. The operational load may be based on other factors that measure the performance or capabilities of the network, such as the current number of users, processes, threads, etc. using the network, the percentage of resources being consumed, and the like. Thus, the temporal window may represent the period of time that users are to be incentivized away from using the network. Although the above discusses a single temporal window being determined, the entitlement platform 103 can determine more than one temporal window based on the operational load of the network. In one embodiment, such multiple windows may be determined based on varying thresholds of the operational load of the network. In one embodiment, two temporal windows may be determined, an on-peak temporal window corresponding to the on-peak times of the operational load and an off-peak temporal window corresponding to the off-peak times of the operational load. However, in one embodiment, any period of time not determined to be within a temporal window may implicitly be considered a temporal window.

In step 303, the entitlement platform 103 creates an entitlement profile corresponding to the temporal window for accessing content over the network. After a temporal window is determined, a profile is created that is then associated with the temporal profile. Users can then subscribe to, or be subscribed to, the entitlement profile to subscribe or be associated with the temporal window. When more than one temporal window is determined at step 301, more than one entitlement profile is created that each correspond to different temporal windows. Alternatively, when more than one temporal window is determined at step 301, more than one temporal window may be associated with a single entitlement profile, or more than one temporal window can be associated with more than one entitlement profile. Thus, the entitlement profiles may be used by a service provider for intelligent management of profiles, by dividing a period of time, such as one day, two days, one week, one month, etc. into various temporal windows and creating various entitlement profiles corresponding to one or more of the temporal windows.

In step 305, the entitlement platform 103 specifies an access right to the content for the entitlement profile applicable during one or more of the corresponding temporal windows. The access right allows a user to access content during the temporal window. In one embodiment, the access can be any type of transmission of the content over the network to the user, such as streaming or downloading the content. In one embodiment, the access can be specifically streaming content to the user. Thus, the combination of the access right for a specific temporal window within an entitlement profile allows a service provider to create profiles that allow users to access content at different times according to different rights, thus allowing diversion of accessing the content and lowering operational load of the network. Moreover, as further discussed below, a service provider, through the entitlement platform 103, may create different incentives, or varying degrees of the same incentive, for the different entitlement profiles to entice users to distribute or divert usage of the network to access content to, for example, off-peak times.

Figure 4:
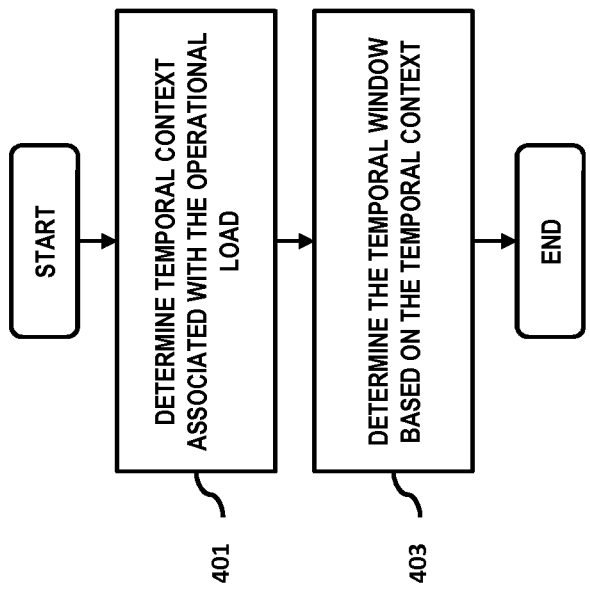
FIG. 4 is a flowchart of determining temporal windows for diverting delivery of content to off-peak times, according to an exemplary embodiment.

FIG. 4 is a flowchart of a process of determining temporal windows for diverting delivery of content to off-peak times, according to one embodiment. In one embodiment, the entitlement platform 103 performs the process 400 and is implemented in, for instance, a chip set including a processor and a memory as shown in FIG. 9. In step 401, the entitlement platform 103 determines temporal context associated with the operational load of the network satisfying at least one threshold. The threshold may be any type of threshold associated with measuring the operational load of a network. The temporal context may be, for example, the timing for when the operational load satisfies the threshold, such as a period of time, periods of time during a day, periods of time during the week, etc. The temporal context may be determined based on past operational load information, current operational load information, or expected future operational load information.

Thus, by way of example, the temporal context may be the timing when the operational load of a network is at a peak-operational load, or within 85% of the peak operational load, which may be between 9 PM and 12 AM. The temporal context may also be the timing when the operational load of a network is not at a peak operational load, which may be between 12 AM and 9 PM. Finer granularity of the timing of the operational load may be determined at finer intervals of temporal context depending on, for example, preferences of service providers in diverting usage of the network to other periods of time.

In step 403, the entitlement platform 103 determines a temporal window based on the temporal context. Thus, where a temporal window is desired that represents the on-peak times of the operational load, the temporal context for the on-peak operational load is determined. In one embodiment, a temporal window may correspond to more than one temporal context.

Figure 5:
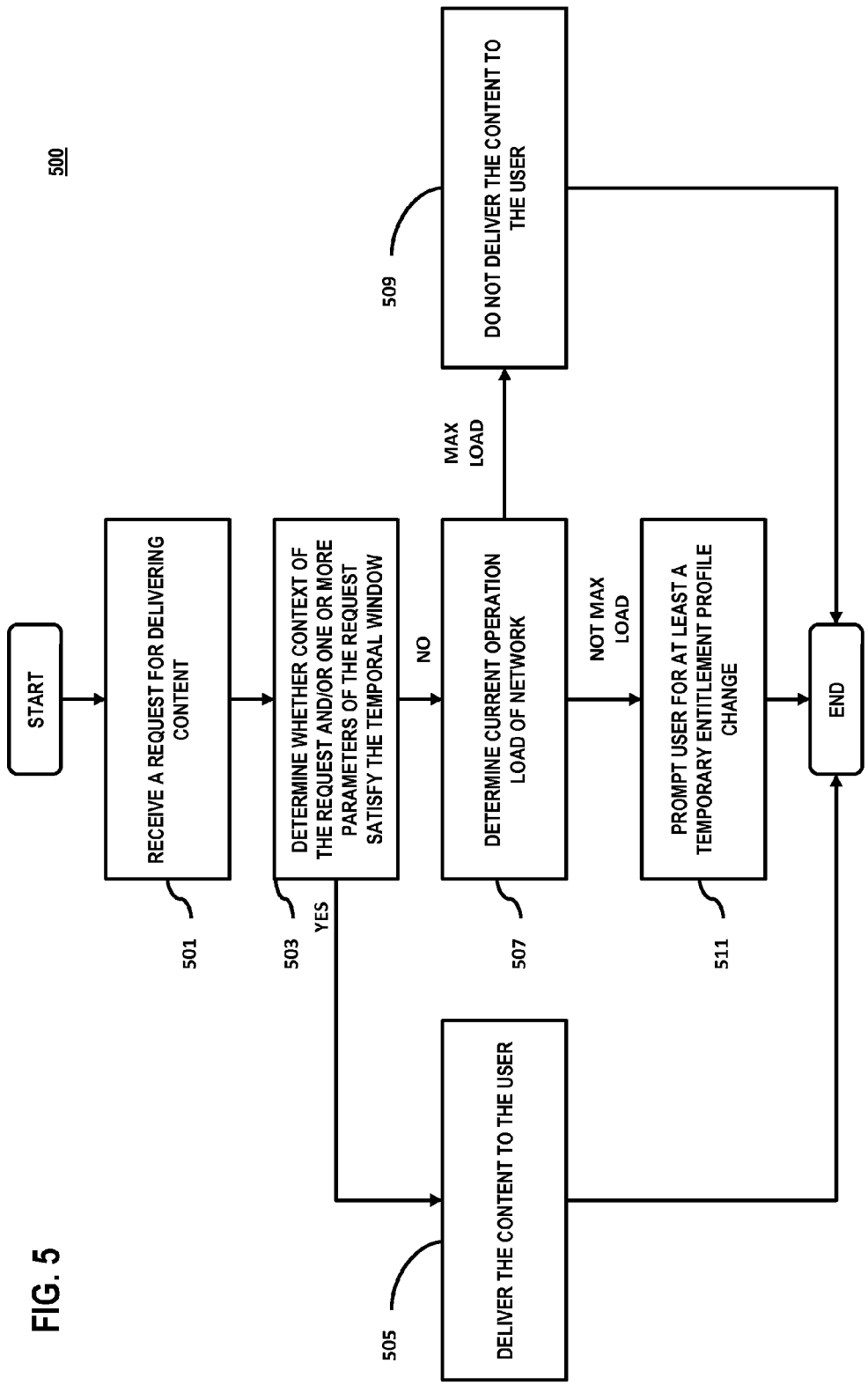
FIG. 5 is a flowchart of delivering content based on a request according to an entitlement profile, according to an exemplary embodiment.

FIG. 5 is a flowchart of a process of delivering content based on a request according to an entitlement profile, according to one embodiment. In one embodiment, the entitlement platform 103 performs the process 500 and is implemented in, for instance, a chip set including a processor and a memory as shown in FIG. 9. Although the process is illustrated as including steps 501 through 511, one or more of the steps may be removed, or one or more of the order of the steps may be changed. In step 501, the entitlement platform 103 receives a request from a user for delivering content to the user over a network. The request may be directed to the entitlement platform 103 from the client or may be sent to the entitlement platform 103 from a different service provider (third-party service provider) servicing the content to the user. For example, a third-party service provider associated with the content databases 105b may be requested by the user to provide content from the content databases 105b. The request may then be directed to the entitlement platform 103 to determine whether the user has access to the content. Further, the user is associated with an entitlement profile that includes access rights to at least one temporal window.

In step 503, the entitlement platform 103 determines whether the context of the request and/or one or more parameters of the requested content satisfy a temporal window of the entitlement profile. The context of the request may be what time the user requested to access the content, such as the moment the request was generated and/or at a future time. Thus, in one embodiment, the entitlement platform 103 determines whether a temporal window corresponding to the entitlement profile associated with the user includes access rights that satisfies the temporal context of the request. In one embodiment, if a temporal window associated with the entitlement profile of the user satisfies the context of the request, the process 500 proceeds to steps 505 and the content is delivered to the user, by either the third-party service provider or by the service provider associated with the entitlement platform 103, or both.

In one embodiment, if the context of the request satisfies a temporal window associated with the entitlement profile of the user, the entitlement platform 103 may also determine whether one or more parameters of the content satisfy the temporal window associated with the entitlement profile. By way of example, one or more the parameters of the content may be a runtime of the content, such as the runtime of a movie. Although the timing of the request may currently be within a temporal window in which the user has access rights to the content, the runtime of the content may exceed the temporal window. In which case, the entitlement platform 103 may not authorize the user to access the content or inform the third-party service provider to not deliver the content to the user. However, in one embodiment, even though the one or more parameters may not satisfy the temporal window, the entitlement platform 103 may still provide the content to the user and subsequently, for example, stop providing the content to the user once the temporary window ends. In this embodiment, the process still proceeds to step 505. However, in embodiment, the entitlement platform 103 may warn the user of the expected end of the temporal window prior to the end of the content.

If, in step 505, the entitlement platform 103 determined that the current context of the request did not satisfy a temporal window in which the user had access rights, or that a parameter of the content did not satisfy a temporal window, the entitlement platform 103 may have determined to not provide access to the content, in which case the process 500 proceeds to step 507.

In step 507, the entitlement platform 103 determines a current operational load of the network associated with the request. The current operational load may be determined according to any approach as discussed above. The entitlement platform 103 may determine the current operational load to determine, for example, if the network can handle any more load associated with delivering the requested content to the user. If the current operational load is at or above a threshold operational load, the entitlement platform 103 may determine to not deliver the content to the user and proceed to step 509 because, for example, delivering the content to the user may degrade the experience or performance of the network with respect to all users. However, if the current operational load is not above a threshold load, the entitlement platform 103 may determine that the additional load on the network associated with delivering the content to the user would not affect the performance of the network or otherwise degrade the experience of other users of the network. Thus, the process 500 may proceed to step 511.

In step 511, the entitlement platform 103 prompts the user for at least a temporary entitlement profile change corresponding to another temporal window, where the context of the request, the one or more parameters of the content, or a combination thereof satisfy the other temporal window. The prompt allows the user to select to at least temporarily change to an entitlement profile that will allow the user to begin accessing the content, or continue accessing the content, depending on whether the prompt is at the time of a request or at the time of an expiration or beginning of another temporal window. Thus, by way of example, if the user requests to access content but the context of the request does not satisfy a temporal window associated with an original entitlement profile of the user, or a parameter such as the runtime of the content would otherwise extend beyond the temporal window associated with the original entitlement profile of the user, the entitlement platform 103 may prompt the user for at least a temporary entitlement profile change to access the content. By way of another example, the entitlement platform 103 may allow a user to access content, such as by streaming a movie to the user, according to a temporal context of the request satisfying a temporal window associated with an entitlement profile of the user. However, during streaming of the content, the temporal window may expire prior to the streaming of the content ending. In this situation, the entitlement platform 103 may prompt the user for at least a temporary change in the entitlement profile to one that is associated with a temporal window that will satisfy the remaining runtime of the movie. If the user accepts the temporary change in the entitlement profile, the user may continue streaming the movie. If the user declines, the user may begin streaming the movie again only as allowed based on access rights associated with the temporal window of the original entitlement profile. In one embodiment, where the incentive is a price different between the entitlement profiles, the temporary change to the other entitlement profile may cost more than the other entitlement profile would otherwise cost had the user initially subscribed to the other entitlement profile.

Figure 6:
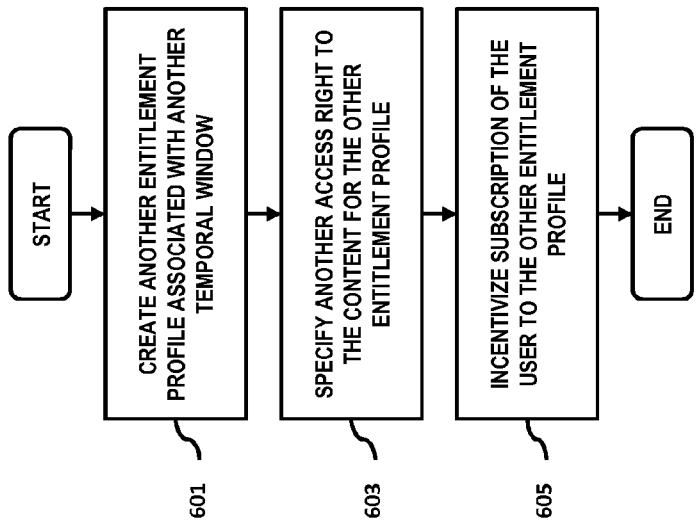
FIG. 6 is a flowchart of incentivizing an entitlement profile for diverting delivery of content to off-peak times, according to an exemplary embodiment.

FIG. 6 is a flowchart of a process incentivizing an entitlement profile for diverting delivery of content to off-peak times, according to one embodiment. In one embodiment, the entitlement platform 103 performs the process 600 and is implemented in, for instance, a chip set including a processor and a memory as shown in FIG. 9. In step 601, and as discussed above, the entitlement platform 103 may create more than one entitlement profile with more than one temporal window. For example, one entitlement profile may correspond to a temporal window during on-peak hours seven days a week, while another entitlement profile may correspond to a temporal window during on-peak hours during no days of the week, or during only the weekends. Thus, one temporal window may represent or correspond to less time during on-peak times of operational load (e.g., above a set threshold) of the network than the other temporal window. Alternatively, where the two entitlement profiles have multiple temporal windows, the total of the temporal windows of one entitlement profile may correspond to less time during on-peak operational load than the other total of operational load.

In step 603, the entitlement platform 103 specifies another access right to the content for the other entitlement profile applicable during the other temporal window. The entitlement platform 103 specifies an access right to the content for the other entitlement profile applicable during the other temporal window. As discussed above, the access right allows a user to access content during the other temporal window. The access can be any type of transmission of the content over the network to the user, such as streaming or downloading the content. In one embodiment, the access can be specifically streaming of the content.

In step 605, the entitlement platform 103 may incentivize subscription of the user to one entitlement profile over the other entitlement profile. Specifically, the entitlement platform 103 may provide an incentive for an entitlement profile that corresponds to less on-peak time than an entitlement profile that corresponds to more on-peak time. Thus, any negative incentive for a user to subscribe to the entitlement profile with less on-peak time is outweighed by another incentive. In one embodiment, the incentive may be pricing associated with subscription to the entitlement profiles, such that subscription to the entitlement profile with more on-peak time is more expensive than subscription to the entitlement profile with less on-peak time. Accordingly, users may have more incentive to subscribe to the entitlement profile associated with less on-peak time than the entitlement profile with more on-peak time. However, the incentive can be based on other factors, or other combinations of factors, such as reduced price for entitlement profiles with less on-peak time and free on-demand content, faster download and upload speeds, and the like.

FIG. 7A is a table 700 of temporal windows 701a-701g (collectively referred to as temporal windows 701) for varying entitlement profiles 703a-703d (collectively referred to as entitlement profiles 703) with varying access rights for a subscription-based content delivery service, according to an exemplary embodiment. As illustrated, the temporal windows 701 include each day of the week and are for the on-peak times of the operational load of a network, such as 9 PM to 12 AM. Further, there are four entitlement profiles 703. Each of the entitlement profiles 703 corresponds to all seven temporal windows 701. However, as indicated by the illustrated Xs, not all of the entitlement profiles 703 have access rights in all of the temporal windows 701. For example, entitlement profile A 703a has access rights in all seven temporal windows 701, entitlement profile B 703b has access rights in temporal windows 701a, 701c, 701e, 701f and 701g, entitlement profile C 703c has access rights in temporal windows 701b, 701d, 701f and 701g, and entitlement profile D 703d has access rights in temporal windows 701f and 701g. Accordingly, a user associated with entitlement profile A 701a as access to content during more on-peak operational load than any other entitlement profile, while entitlement profile D 701d has access to content during fewer on-peak operational load than any other entitlement profile. Accordingly, as an incentive for a user to subscribe to entitlement profile D 703d rather than entitlement profile A 703a, the price for entitlement profile D 703d may be, for example, $5 a month and the price for entitlement profile A 703a may be, for example, $10 a month, with the other two entitlement profiles somewhere between.

FIG. 7B is a table of temporal windows 711a and 711b (collectively referred to as temporal windows 711) for varying entitlement profiles 713a-713d (collectively referred to as entitlement profiles 713) with varying access rights for an on-demand-based content delivery service, according to an exemplary embodiment. As illustrated, the temporal windows 711 include, for example, two consecutive days for the on-peak times of the operational load of a network, such as 9 PM to 12 AM. Further, there are four entitlement profiles 713. Each of the entitlement profiles 713 corresponds to both of the temporal windows 711. However, as indicated by the illustrated Xs, not all of the entitlement profiles 713 have access rights in all of the temporal windows 711. For example, entitlement profile A 713a has access rights in all of the temporal windows 711, entitlement profile B 713b has access rights in temporal window 711a, entitlement profile C 713c has access rights in temporal window 711b, and entitlement profile D 713d has access rights in none of the temporal windows 711. Accordingly, a user associated with entitlement profile A 711a has access to content more during on-peak operational load than any other entitlement profile, while entitlement profile D 711d has access to content during no on-peak operational load. Accordingly, as an incentive for a user to subscribe to entitlement profile D 713d rather than entitlement profile A 713a, the price for entitlement profile D 713d may be, for example, $1.99 for the on-demand streaming of the content, and the price for entitlement profile A 713a may be, for example, $5.99 for the on-demand streaming, with the other two entitlement profiles somewhere between.

The processes described herein for diverting delivery of content to off-peak times may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
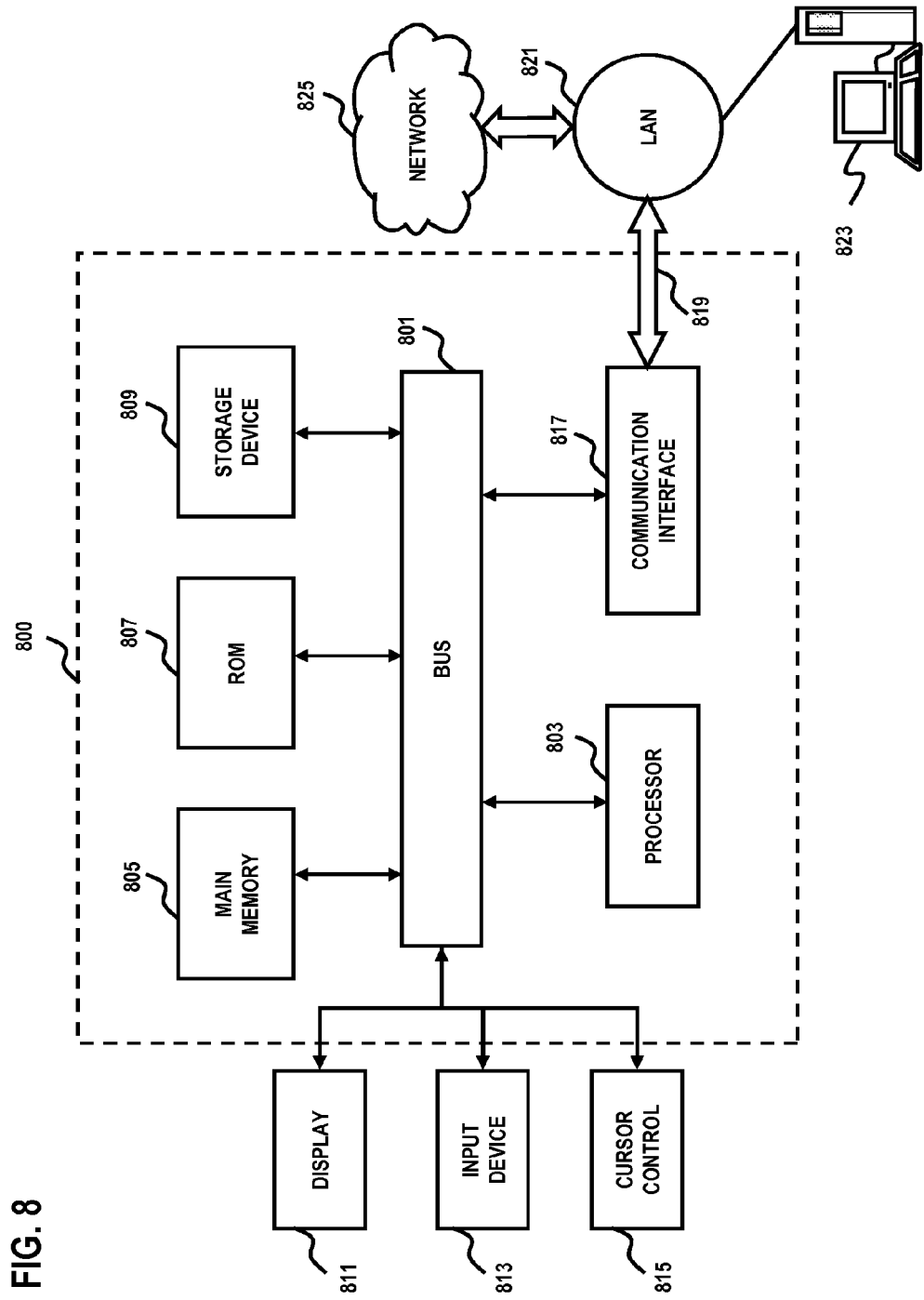
FIG. 8 is a diagram of a computer system that can be used to implement various exemplary embodiments.

FIG. 8 illustrates computing hardware (e.g., computer system) upon which an embodiment according to the invention can be implemented. The computer system 800 includes a bus 801 or other communication mechanism for communicating information and a processor 803 coupled to the bus 801 for processing information. The computer system 800 also includes main memory 805, such as random access memory (RAM) or other dynamic storage device, coupled to the bus 801 for storing information and instructions to be executed by the processor 803. Main memory 805 also can be used for storing temporary variables or other intermediate information during execution of instructions by the processor 803. The computer system 800 may further include a read only memory (ROM) 807 or other static storage device coupled to the bus 801 for storing static information and instructions for the processor 803. A storage device 809, such as a magnetic disk or optical disk, is coupled to the bus 801 for persistently storing information and instructions.

The computer system 800 may be coupled via the bus 801 to a display 811, such as a cathode ray tube (CRT), liquid crystal display, active matrix display, or plasma display, for displaying information to a computer user. An input device 813, such as a keyboard including alphanumeric and other keys, is coupled to the bus 801 for communicating information and command selections to the processor 803. Another type of user input device is a cursor control 815, such as a mouse, a trackball, or cursor direction keys, for communicating direction information and command selections to the processor 803 and for controlling cursor movement on the display 811.

According to an embodiment of the invention, the processes described herein are performed by the computer system 800, in response to the processor 803 executing an arrangement of instructions contained in main memory 805. Such instructions can be read into main memory 805 from another computer-readable medium, such as the storage device 809. Execution of the arrangement of instructions contained in main memory 805 causes the processor 803 to perform the process steps described herein. One or more processors in a multi-processing arrangement may also be employed to execute the instructions contained in main memory 805. In alternative embodiments, hard-wired circuitry may be used in place of or in combination with software instructions to implement the embodiment of the invention. Thus, embodiments of the invention are not limited to any specific combination of hardware circuitry and software.

The computer system 800 also includes a communication interface 817 coupled to bus 801. The communication interface 817 provides a two-way data communication coupling to a network link 819 connected to a local network 821. For example, the communication interface 817 may be a digital subscriber line (DSL) card or modem, an integrated services digital network (ISDN) card, a cable modem, a telephone modem, or any other communication interface to provide a data communication connection to a corresponding type of communication line. As another example, communication interface 817 may be a local area network (LAN) card (e.g. for Ethernet™ or an Asynchronous Transfer Model (ATM) network) to provide a data communication connection to a compatible LAN. Wireless links can also be implemented. In any such implementation, communication interface 817 sends and receives electrical, electromagnetic, or optical signals that carry digital data streams representing various types of information. Further, the communication interface 817 can include peripheral interface devices, such as a Universal Serial Bus (USB) interface, a PCMCIA (Personal Computer Memory Card International Association) interface, etc. Although a single communication interface 817 is depicted in FIG. 8, multiple communication interfaces can also be employed.

The network link 819 typically provides data communication through one or more networks to other data devices. For example, the network link 819 may provide a connection through local network 821 to a host computer 823, which has connectivity to a network 825 (e.g. a wide area network (WAN) or the global packet data communication network now commonly referred to as the "Internet") or to data equipment operated by a service provider. The local network 821 and the network 825 both use electrical, electromagnetic, or optical signals to convey information and instructions. The signals through the various networks and the signals on the network link 819 and through the communication interface 817, which communicate digital data with the computer system 800, are exemplary forms of carrier waves bearing the information and instructions.

The computer system 800 can send messages and receive data, including program code, through the network(s), the network link 819, and the communication interface 817. In the Internet example, a server (not shown) might transmit requested code belonging to an application program for implementing an embodiment of the invention through the network 825, the local network 821 and the communication interface 817. The processor 803 may execute the transmitted code while being received and/or store the code in the storage device 809, or other non-volatile storage for later execution. In this manner, the computer system 800 may obtain application code in the form of a carrier wave.

The term "computer-readable medium" as used herein refers to any medium that participates in providing instructions to the processor 803 for execution. Such a medium may take many forms, including but not limited to non-volatile media, volatile media, and transmission media. Non-volatile media include, for example, optical or magnetic disks, such as the storage device 809. Volatile media include dynamic memory, such as main memory 805. Transmission media include coaxial cables, copper wire and fiber optics, including the wires that comprise the bus 801. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

FIG. 9 illustrates a chip set 900 upon which an embodiment of the invention may be implemented. Chip set 900 is programmed to divert delivery of content to off-peak times as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 900, or a portion thereof, constitutes a means for performing one or more steps of FIGS. 3-6.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to perform specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to controlling a set-top box based on device events. The memory 905 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   determining a plurality of temporal windows for accessing content over a network based on an operational load of the network, wherein one temporal window is a period of clock time during which an operational load of the network is above a threshold load indicating on-peak operational load of the network;
   creating a plurality of entitlement profiles corresponding to the plurality of temporal windows for accessing content over the network, wherein a plurality of users are associated with the plurality of entitlement profiles for a fee with the fee being different for each of the plurality of entitlement profiles; and
   specifying an access right to the content for each of the plurality of entitlement profiles that is applicable during each of the plurality of temporal windows,
   wherein the specified access right to the content for said each of the plurality of entitlement profiles indicates one of a right to access the content and no right to access content during said each of the plurality of temporal windows.

2. A method according to claim 1, further comprising:
   receiving a request from a user associated with one of the plurality of entitlement profiles for delivering the content over the network during one of the plurality of temporal windows; and
   delivering the content to the user over the network based on whether a context of the request, one or more parameters of the content, or a combination thereof satisfy the one of the plurality of temporal windows,
   wherein the context of the request comprises the time that the user requests to be able to access the content, and
   wherein the one or more parameters comprise a runtime of the accessed content or a download time required to deliver the accessed content to the user.

3. A method according to claim 2, further comprising:
   determining that the context of the request, the one or more parameters of the content, or a combination thereof do not satisfy the one of the plurality of temporal windows; and
   prompting the user for at least a temporary entitlement profile change corresponding to another one of the plurality of temporal windows, wherein the context of the request, the one or more parameters of the content, or a combination thereof satisfy the other one of the plurality of temporal windows.

4. A method according to claim 3, further comprising:
determining current operational load of the network associated with the request; and
prompting the user for the temporary entitlement profile change based on the current operational load.

5. A method according to claim 1, wherein one user is associated with an entitlement profile that is associated with said one temporal window, and wherein one other temporal window corresponds to less clock time during the on-peak operational load of the network than the one temporal window, the method further comprising:
incentivizing subscription of the one user from the entitlement profile associated with said one temporal window to another entitlement profile associated with said one other temporal window.

6. A method according to claim 5, further comprising:
incentivizing subscription of the one user to the other entitlement profile based on pricing of the fee for subscribing to the entitlement profile associated with said one temporal window to be greater than the fee for subscribing to the other entitlement profile associated with said one other temporal window.

7. A method according to claim 1, wherein the network is a public network independent of a service provider delivering the content, and the content is streamed content.

8. An apparatus comprising:
a processor configured to:
determine a plurality of temporal windows for accessing content over a network based on an operational load of the network, wherein one temporal window is a period of clock time during which an operational load of the network is above a threshold load indicating on-peak operational load of the network;
create a plurality of entitlement profiles corresponding to the plurality of temporal windows for accessing content over the network, wherein a plurality of users are associated with the plurality of entitlement profiles for a fee with the fee being different for each of the plurality of entitlement profiles; and
specify an access right to the content for each of the plurality of entitlement profiles that is applicable during each of the plurality of temporal windows,
wherein the specified access right to the content for said each of the plurality of entitlement profiles indicates one of a right to access the content and no right to access content during said each of the plurality of temporal windows.

9. An apparatus according to claim 8, the processor being further configured to:
receive a request from the user associated with the entitlement profile for delivering the content over the network; and
receive a request from a user associated with one of the plurality of entitlement profiles for delivering the content over the network during one of the plurality of temporal windows; and
deliver the content to the user over the network based on whether a context of the request, one or more parameters of the content, or a combination thereof satisfy the one of the plurality of temporal windows,
wherein the context of the request comprises the time that the user requests to be able to access the content, and wherein the one or more parameters comprise a runtime of the accessed content or a download time required to deliver the accessed content to the user.

10. An apparatus according to claim 9, the processor being further configured to:
determine that the context of the request, the one or more parameters of the content, or a combination thereof do not satisfy the one of the plurality of temporal windows; and
prompt the user for at least a temporary entitlement profile change corresponding to another one of the plurality of temporal windows,
wherein the context of the request, the one or more parameters of the content, or a combination thereof satisfy the other one of the plurality of temporal windows.

11. An apparatus according to claim 10, the processor being further configured to:
determine current operational load of the network associated with the request; and
prompt the user for the temporary entitlement profile change based on the current operational load.

12. An apparatus according to claim 8, wherein one user is associated with an entitlement profile that is associated with said one temporal window, and wherein one other temporal window corresponds to less clock time during the on-peak operational load of the network than the one temporal window, the processor being further configured to:
incentivize subscription of the one user from the entitlement profile associated with said one temporal window to another entitlement profile associated with said one other temporal window.

13. An apparatus according to claim 12, the processor being further configured to:
incentivize subscription of the one user to the other entitlement profile based on pricing of the fee for subscribing to the entitlement profile associated with said one temporal window to be greater than the fee for subscribing to the other entitlement profile associated with said one other temporal window.

14. An apparatus according to claim 8, wherein the network is a public network independent of a service provider delivering the content, and the content is streamed content.

15. A system comprising:
a network; and
an entitlement platform comprising:
at least one processor; and
at least one memory including computer program code,
the at least one memory and the computer program code, with the at least one processor, cause performance of at least the following:
determine a plurality of temporal windows for accessing content over a network based on an operational load of the network, wherein one temporal window is a period of clock time during which an operational load of the network is above a threshold load indicating on-peak operational load of the network;
create a plurality of entitlement profiles corresponding to the plurality of temporal windows for accessing content over the network, wherein a plurality of users are associated with the plurality of entitlement profiles for a fee with the fee being different for each of the plurality of entitlement profiles; and
specify an access right to the content for each of the plurality of entitlement profiles that is applicable during each of the plurality of temporal windows,
wherein the specified access right to the content for said each of the plurality of entitlement profiles indicates one of a right to access the content and no right to access content during said each of the plurality of temporal windows.

16. A system according to claim 15, wherein a user device is configured to transmit a request from a user associated with one of the plurality of entitlement profiles, for delivering the content over the network during one of the plurality of temporal windows to the user device, and the at least one memory and the computer program code, with the at least one processor, further cause performance of:

deliver the content to the user over the network based on whether a context of the request, one or more parameters of the content, or a combination thereof satisfy the one of the plurality of temporal windows, wherein the context of the request comprises the time that the user requests to be able to access the content, and wherein the one or more parameters comprise a runtime of the accessed content or a download time required to deliver the accessed content to the user.

17. A system according to claim 16, the at least one memory and the computer program code, with the at least one processor, further cause performance of:

determine that the context of the request, the one or more parameters of the content, or a combination thereof do not satisfy the one of the plurality of temporal windows; and prompt the user for at least a temporary entitlement profile change corresponding to another one of the plurality of temporal windows, wherein the context of the request, the one or more parameters of the content, or a combination thereof satisfy the other one of the plurality of temporal windows.

* * * * *